United States Patent
Adachi et al.

(10) Patent No.: US 10,243,338 B2
(45) Date of Patent: Mar. 26, 2019

(54) FIXING STRUCTURE FOR WIRING MATERIAL AND WIRE HARNESS

(71) Applicant: YAZAKI CORPORATION, Tokyo (JP)

(72) Inventors: Hideomi Adachi, Shizuoka (JP); Hidehiko Kuboshima, Shizuoka (JP); Masashi Tsukamoto, Shizuoka (JP)

(73) Assignee: YAZAKI CORPORATION, Tokyo (JP)

( * ) Notice: Subject to any disclaimer, the term of this patent is extended or adjusted under 35 U.S.C. 154(b) by 0 days.

(21) Appl. No.: 15/078,647

(22) Filed: Mar. 23, 2016

(65) Prior Publication Data

US 2016/0284440 A1    Sep. 29, 2016

(30) Foreign Application Priority Data

Mar. 23, 2015    (JP) .................. 2015-060004

(51) Int. Cl.
*H02G 3/06* (2006.01)
*B60R 16/02* (2006.01)
*H02G 3/32* (2006.01)

(52) U.S. Cl.
CPC ....... *H02G 3/0691* (2013.01); *B60R 16/0215* (2013.01); *H02G 3/32* (2013.01)

(58) Field of Classification Search
CPC .. H01B 7/0045; H01R 9/0524; H02G 15/085; H02G 3/0468; H02G 3/0691; H02G 3/32; B60R 16/0215
USPC .................... 174/72 A, 88 C, 75 C; 248/74.2
See application file for complete search history.

(56) References Cited

U.S. PATENT DOCUMENTS

| | | | |
|---|---|---|---|
| 2004/0154817 A1* | 8/2004 | Sudo ................. | H02G 3/06 174/481 |
| 2007/0187144 A1* | 8/2007 | Kato ................. | H02G 3/0468 174/72 A |
| 2009/0050350 A1* | 2/2009 | Katsumata .......... | H02G 3/0691 174/135 |
| 2009/0166480 A1* | 7/2009 | Sakata .............. | B60R 16/0215 248/71 |

(Continued)

FOREIGN PATENT DOCUMENTS

| JP | 7-245841 A | 9/1995 |
|---|---|---|
| JP | 2003-18727 A | 1/2003 |

(Continued)

OTHER PUBLICATIONS

JP 2013-027212, English Translation.*

(Continued)

*Primary Examiner* — Steven T Sawyer
(74) *Attorney, Agent, or Firm* — Kenealy Vaidya LLP (57) ABSTRACT

A corrugated tube is formed in a cylindrical shape to cover an electric wire that is made of at least a conductive material, extends in one direction, and inserted into the corrugated tube. A holding member is fixed to the corrugated tube. A tie band fixes a part of the electric wire to the holding member, the part being extended outwardly from the corrugated tube. With this constitution, the electric wire inserted into the corrugated tube can be fixed to the holding member fixed to the corrugated tube by the tie band thus fixing the electric wire to the corrugated tube formed in a cylindrical shape.

11 Claims, 7 Drawing Sheets

(56) References Cited

U.S. PATENT DOCUMENTS

| | | | |
|---|---|---|---|
| 2010/0147584 A1* | 6/2010 | Suzuki | B60R 16/0215 |
| | | | 174/72 C |
| 2011/0284266 A1 | 11/2011 | Deno et al. | |
| 2012/0261184 A1* | 10/2012 | Kitamura | B60R 16/0215 |
| | | | 174/72 A |
| 2012/0298404 A1* | 11/2012 | Tokunaga | B60R 16/0215 |
| | | | 174/135 |
| 2014/0151514 A1* | 6/2014 | Asai | B60R 16/0215 |
| | | | 248/74.1 |
| 2014/0196929 A1* | 7/2014 | Okuhara | H02G 3/0468 |
| | | | 174/68.3 |
| 2014/0332266 A1 | 11/2014 | Yoshida et al. | |
| 2014/0338971 A1* | 11/2014 | Yoshida | B60R 16/0215 |
| | | | 174/72 A |
| 2016/0248235 A1* | 8/2016 | Itou | B60R 16/0215 |

FOREIGN PATENT DOCUMENTS

| | | | |
|---|---|---|---|
| JP | 2003-153411 A | 5/2003 |
| JP | 2010-268563 A | 11/2010 |
| JP | 2013-158226 A | 8/2013 |
| JP | 2014-180147 A | 9/2014 |

OTHER PUBLICATIONS

Japanese Office Action for the related Japanese Patent Application No. 2015-060004 dated Mar. 21, 2017.
Japanese Office Action for the related Japanese Patent Application No. 2015-060004 dated May 23, 2017.

* cited by examiner

FIXING STRUCTURE FOR WIRING MATERIAL AND WIRE HARNESS

CROSS-REFERENCE TO RELATED APPLICATION(S)

The present application claims priority to and incorporates by reference the entire contents of Japanese Patent Application No. 2015-060004 filed in Japan on Mar. 23, 2015.

BACKGROUND OF THE INVENTION

1. Field of the Invention

The present invention relates to a fixing structure for a wiring material and to a wire harness.

2. Description of the Related Art

In an automobile, a number of wiring materials, such as an electric wire, for the supply of electric power to an electric component and the transmission of an electrical signal to an electric component are provided. In the automobile, in order to protect these wiring materials, many parts in the wiring material are covered by respective sheaths. In this case, in order to prevent the wiring material from being damaged by the vibration of the wiring material in the sheath, some of conventional wiring materials are fixed to the respective sheaths. For example, Japanese Patent Application Laid-open No. H07-245841 describes a waterproof structure for a wire harness in which an adhesive-coated waterproof sheet wraps an electric wire thus bonding the adhesive on the peripheral face of the electric wire with no gap and bonding the edges of the waterproof sheet to each other in a wrapped-around state.

However, when a member formed in a cylindrical shape in advance, such as a corrugated tube, is used as a sheath for covering a wiring material, it is difficult to apply the adhesive to the inside of the sheath and adhere the sheath and the wiring material to each other by using the adhesive. Accordingly, the use of such a member, formed in a cylindrical shape in advance as the sheath for covering the wiring material, makes it difficult to fix the wiring material to the sheath.

SUMMARY OF THE INVENTION

The present invention has been made in view of the above circumstances, and an object thereof is to provide a fixing structure for a wiring material and a wire harness capable of fixing a wiring material to a sheath formed in a cylindrical shape.

In order to achieve the above mentioned object, a fixing structure for a wiring material according to one aspect of the present invention includes a holding member fixed to a sheath that is formed in a cylindrical shape and covers a wiring material inserted therein, the wiring material being made of at least a conductive material and extending in one direction; and a wiring-material fixing member that fixes a part of the wiring material to the holding member, the part being extended outwardly from the sheath.

In the fixing structure for the wiring material according to another aspect of the present invention, it is preferable that the sheath includes a part formed in a bellows shape, the holding member includes a protruding portion on a surface thereof facing the sheath when the holding member is fixed to the sheath, and the protruding portion is inserted into a valley part of the bellows shape and fixed to the sheath so as to restrict movement of the holding member relative to the sheath in an extending direction of the sheath.

In the fixing structure for the wiring material according to still another aspect of the present invention, it is preferable to further include a holding-member fixing member that integrally wraps the holding member and the sheath so as to fix the holding member to the sheath.

In the fixing structure for the wiring material according to still another aspect of the present invention, it is preferable that the wiring-material fixing member binds the wiring material on the holding member so as to fix the wiring material to the holding member.

In the fixing structure for the wiring material according to still another aspect of the present invention, it is preferable that the wiring-material fixing member integrally wraps the wiring material and the holding member so as to fix the wiring material to the holding member.

A wire harness according to still another aspect of the present invention includes a wiring material that is made of at least a conductive material and extends in one direction; a sheath that is formed in a cylindrical shape and covers the wiring material inserted therein; and a fixing structure for the wiring material, the fixing structure including a holding member fixed to the sheath from the outside of the sheath, and a wiring-material fixing member that fixes a part of the wiring material to the holding member, the part being extended outwardly from the sheath.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Hereinafter, embodiments of a fixing structure for a wiring material according to the present invention is explained in detail based on the accompanying drawings. Here, the present invention is not limited to these embodiments. Furthermore, the following embodiments include constitutional features that can be replaced easily by those skilled in the art, or substantially identical constitutional features.

First Embodiment

Figure 1:
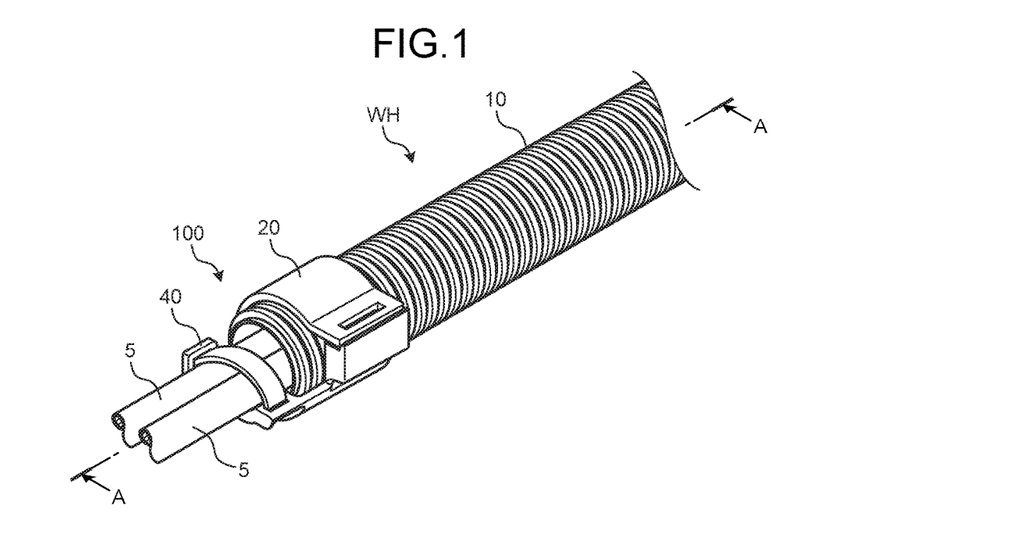
FIG. 1 is a perspective view of a wire harness according to a first embodiment.
Figure 2:
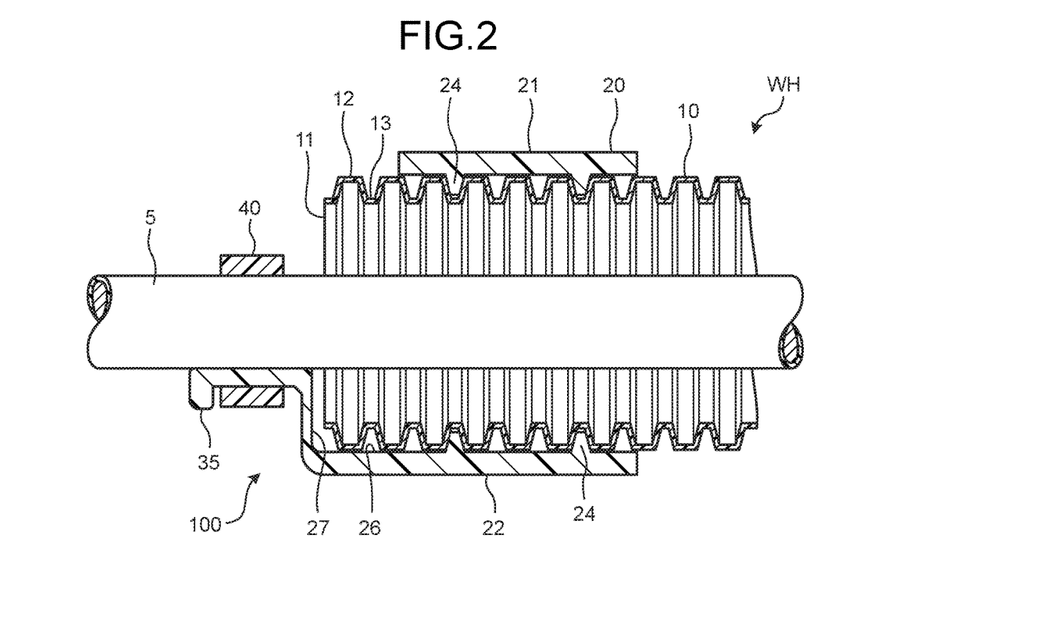
FIG. 2 is a cross-sectional view taken along a line A-A in FIG. 1.

FIG. 1 is a perspective view of a wire harness according to a first embodiment. FIG. 2 is a cross-sectional view taken along a line A-A in FIG. 1. FIG. 1 and FIG. 2 illustrate a wire harness WH that connects, for example, respective devices mounted on an automobile or the like to each other for power supply or signal communication. The wire harness WH may be constituted of various kinds of components, such as an electric connection box (junction box), a grommet, and a fixture. The wire harness WH according to the first embodiment is, for example, applied to what is called a hybrid vehicle (HV), and arranged on the under floor of the HV. However, the first embodiment is not limited to this example. A fixing structure 100 according to the first embodiment is applied to the wire harness WH. The wire harness WH includes electric wires 5, a corrugated tube 10, and the fixing structure 100. The fixing structure 100 includes a holding member 20 and a tie band 40.

The electric wires 5 included in the wire harness WH are inserted into the corrugated tube 10 formed in a cylindrical shape, and a part of the electric wires 5 are arranged so as to be extended outwardly from the corrugated tube 10. Each of the electric wires 5 includes at least a conductive material, and serves as a wiring material extending in one direction. To be more specific, the electric wire 5 includes a conductive part formed of a plurality of strands each including a conductive material, and an insulating covering part that covers the outer periphery of the conductive part. The conductive part is a conductive core wire made of a metallic material through which electricity passes, and the strand that constitutes the conductive part is made of conductive metal, such as copper, copper alloy, aluminum, or aluminum alloy. In this manner, the conductive part is formed of a plurality of strands each made of metallic material, the strands being bundled or twisted. The covering part is, for example, made of an insulating resin material, and brought into contact with the outer peripheral face of the conductive part to cover the outer peripheral face of the conductive part.

The corrugated tube 10 is formed in an approximately cylindrical shape and has an inside diameter larger than the outside diameter of the electric wire 5. The corrugated tube 10 is formed as a sheath for protecting the electric wire 5, the sheath being capable of covering the electric wire 5 inserted therein. To be more specific, the corrugated tube 10 is made of resin material, and includes a part formed in a bellows shape in which a crest part 12 formed in an outward convex shape in the diameter direction of the cylindrical shape and a valley part 13 formed in an inward convex shape in the diameter direction of the cylindrical shape are contiguously formed with each other in the longitudinal direction. With this constitution, the corrugated tube 10 has flexibility. The corrugated tube 10 formed in this manner has a certain length in the axial direction of the cylindrical shape to cover a certain area in the extending direction of the electric wire 5. At least a part of the electric wire 5 inserted into the corrugated tube 10 is extended outwardly from the corrugated tube 10.

Here, the number of the electric wires 5 inserted into the corrugated tube 10 in this manner is not limited to one, and may be two or more. For example, as illustrated in FIG. 1, the number of the electric wires 5 inserted into the corrugated tube 10 may be two. The number of the electric wires 5 inserted into the corrugated tube 10 may be one or more. Furthermore, in the corrugated tube 10, the part formed in a bellows shape may be formed in an extending manner over the entire length of the corrugated tube 10, or a part of the corrugated tubes 10 may be formed in a bellows shape.

The holding member 20 is fixed on the outside of the corrugated tube 10. The holding member 20 is secured in the vicinity of an end portion 11 thereof. The holding member 20 has a certain width in the longitudinal direction of the corrugated tube 10, and is formed in the substantially annular shape to cover the entire circumference of the corrugated tube 10.

A part of each electric wire 5 extended outwardly from the corrugated tube 10 is fixed to the holding member 20 by the tie band 40 that is a wiring-material fixing member for fixing the electric wire 5 to the holding member 20. The tie band 40 imparts, to the holding member 20 and the electric wire 5, a tensile force in the direction in which the electric wire 5 is brought closer to the holding member 20 thus binding the electric wire 5 on the holding member 20 and fixing the electric wire 5 to the holding member 20. The tie band 40 that fixes the electric wire 5 to the holding member 20 is made of a resin material, formed in a flexible strip shape, and provided with a locking mechanism capable of forming the tie band 40 strip-shaped into an annular shape. The locking mechanism allows adjustments to decrease the circular size of the annular shape, and restricts adjustments to increase the circular size of the annular shape. Due to such a constitution, the tie band 40 is deformed into an annular shape, and decreases the circular size of the annular shape in a state that a part of the holding member 20 and the electric wire 5 are set in the inside of the annular shape thus imparting the tensile force to the holding member 20 and the electric wire 5 in the direction in which the electric wire 5 is brought closer to the holding member 20 and binding the electric wire 5 on the holding member 20.

Figure 3:
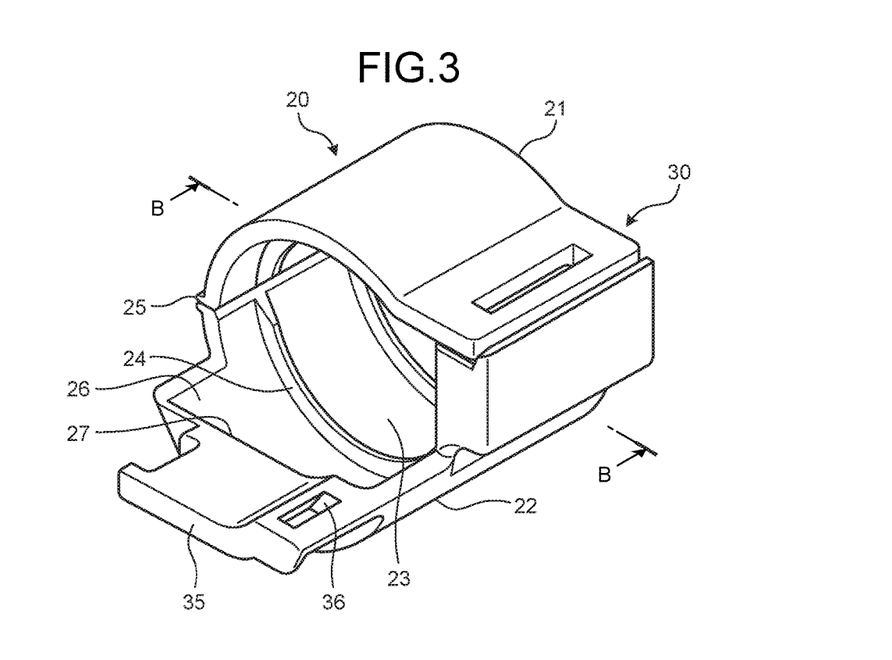
FIG. 3 is a perspective view of a holding member illustrated in FIG. 1.
Figure 4:
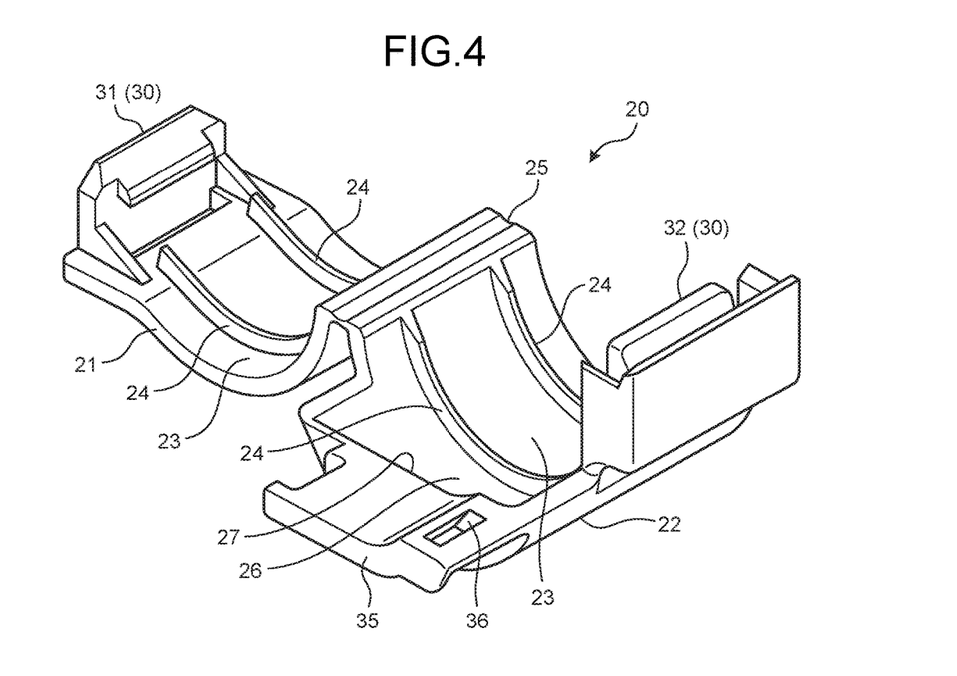
FIG. 4 is a perspective view illustrating a first member and a second member of the holding member illustrated in FIG. 3 in an open state.

FIG. 3 is a perspective view of the holding member illustrated in FIG. 1. FIG. 4 is a perspective view illustrating a first member and a second member of the holding member illustrated in FIG. 3 in an open state. The holding member 20 formed in a substantially annular shape is constituted by assembling a first member 21 and a second member 22 each of which is formed in a substantially semicircle shape as viewed in the axial direction of the annular shape. One end portion of the first member 21 and one end portion of the second member 22 as viewed in the axial direction thereof are connected with each other by a hinges 25. Accordingly, the first member 21 and the second member 22 are rotatably connected with each other in an openable/closeable manner about the hinge 25 in the direction in which the other end portion of the first member 21 and the other end portion of the second member 22 come close to and separate from each other as viewed in the axial direction, each of the other end portions being opposite to the corresponding one end portion on which the hinge 25 is arranged. When the first member 21 and the second member 22 sandwich the corrugated tube 10 therebetween, the holding member 20 is fixed to the corrugated tube 10.

Furthermore, the first member 21 and the second member 22 includes a locking mechanism 30 arranged on each of the other end portions opposite to the corresponding one end portion on which the hinge 25 is arranged, the locking mechanism 30 engaging the respective other end portions of the first member 21 and the second member 22 with each other. That is, the locking mechanism 30 is arranged on each of the other end portions opposite to the corresponding one end portion on which the hinge 25 is arranged in the circumferential direction of the first member 21 or the second member 22.

Figure 5:
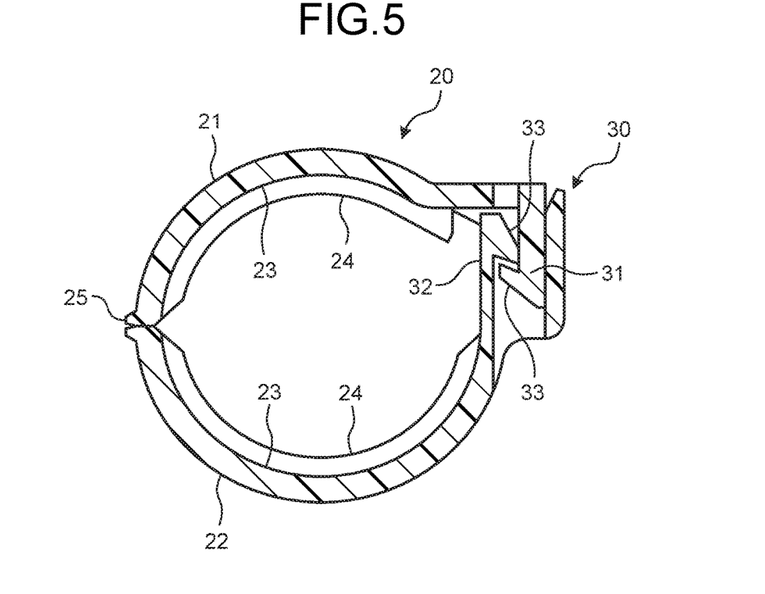
FIG. 5 is a cross-sectional view taken along a line B-B in FIG. 3.

FIG. 5 is a cross-sectional view taken along a line B-B in FIG. 3. In the locking mechanism 30, a first-member-side engaging claw 31 arranged on the first member 21 and a second-member-side engaging claw 32 arranged on the second member 22 are engaged with each other thus engaging the respective other ends of the first member 21 and the second member 22 with each other. To be more specific, the first-member-side engaging claw 31 extends toward the second member 22 from the other end portion opposite to the one end portion on which the hinge 25 is arranged in the first member 21, and the second-member-side engaging claw 32 extends toward the first member 21 from the other end portion opposite to the one end portion on which the hinge 25 is arranged in the second member 22.

The first-member-side engaging claw 31 and the second-member-side engaging claw 32 overlap the positions thereof in the closing direction of the first member 21 and the second member 22 in a state that the first member 21 and the second member 22 are closed, and a claw portion 33 is formed on each of the first-member-side engaging claw 31 and the second-member-side engaging claw 32 at a position such that the first-member-side engaging claw 31 and the second-member-side engaging claw 32 overlap each other, the claw portion 33 projecting toward the other engaging claw side. The first-member-side engaging claw 31 and the second-member-side engaging claw 32 are formed so that the claw portions 33 are engaged with each other thus restricting the relative movement between the first-member-side engaging claw 31 and the second-member-side engaging claw 32 in the direction in which the first member 21 and the second member 22 disengage from each other. In this manner, the locking mechanism 30 restricts the relative movement between the first-member-side engaging claw 31 and the second-member-side engaging claw 32 thus engaging the respective end portions of the first member 21 and the second member 22 with each other.

Furthermore, the holding member 20 includes protruding portions 24 each formed on a surface facing the corrugated tube 10 when the holding member 20 is fixed to the corrugated tube 10; that is, on an inner surface 23 of the holding member 20 formed in a substantially annular shape. The protruding portion 24 has a comparatively small thickness in the axial direction of the holding member 20, and extends in the circumferential direction with a certain height from the inner surface 23 of the holding member 20. That is, the protruding portion 24 is formed in a substantially annular shape about the center axis of the annular shape that is the shape of the holding member 20. The respective protruding portions 24 formed in this manner are separately constituted and arranged on both of the inner surface 23 of the first member 21 and the inner surface 23 of the second member 22. The protruding portions 24 form one annular shape when the first member 21 and the second member 22 are closed. That is, a pair of the respective protruding portions 24 arranged on the inner surface 23 of the first member 21 and the inner surface 23 of the second member 22 are located at substantially the same position in the axial direction of the holding member 20.

Each of the protruding portions 24 formed in this manner has a height approximately equal to the depth of the valley part 13 of the corrugated tube 10. A plurality of protruding portions 24 are arranged next to each other in the axial direction of the holding member 20 on the inner surface 23 of the holding member 20, and the protruding portions 24 are arranged at a distance close to the integral multiple of the pitch of the valley parts 13 in the longitudinal direction of the corrugated tube 10.

Furthermore, the second member 22 includes a tolerance absorption part 26 that is a part for absorbing the dimensional tolerances of the corrugated tube 10. The tolerance absorption part 26 is provided to the second member 22 in a projected manner from the first member 21 in the axial direction of the holding member 20. When the holding member 20 is set around the corrugated tube 10, the tolerance absorption part 26 is capable of covering the vicinity of the end portion 11 of the corrugated tube 10. In the tolerance absorption part 26 provided in this manner, an end portion of the holding member 20 in the axial direction includes an abutment portion 27 capable of facing the end portion 11 of the corrugated tube 10 in an opposed manner and abutting on the end portion 11 when the holding member 20 is set around the corrugated tube 10.

Furthermore, the second member 22 includes an electric-wire fixing part 35 that is a part for fixing the electric wire 5 to the holding member 20. The electric-wire fixing part 35 is projected from one end of the second member 22 in the axial direction of the holding member 20 so that the electric-wire fixing part 35 projects in the same direction as the axial direction of the holding member 20 relative to an end portion of the first member 21. To be more specific, the electric-wire fixing part 35 is projected from the tolerance absorption part 26 provided to the second member 22, and projected from the abutment portion 27 of the tolerance absorption part 26 in the axial direction of the holding member 20. The electric-wire fixing part 35 forms therein a fixing-use hole 36 into which the tie band 40 is inserted. The fixing-use hole 36 is capable of inserting the tie band 40 thereinto when the electric wire 5 is fixed to the holding member 20 by the tie band 40.

The wire harness WH according to the first embodiment is constituted as mentioned above. Next, the explanation is made with respect to a method for fixing the electric wire 5 to the corrugated tube 10 by using a fixing structure 100 of the wire harness WH according to the first embodiment. When the electric wire 5 is fixed to the corrugated tube 10, first of all, the holding member 20 is set in the vicinity of the end portion 11 of the corrugated tube 10 into which the electric wire 5 is inserted. When the holding member 20 is attached to the corrugated tube 10, the orientation of the holding member 20 is defined so that the electric-wire fixing part 35 is positioned on a side of the corrugated tube 10 close to the end portion 11 and the electric-wire fixing part 35 directly faces the electric wire 5 extended outwardly from the corrugated tube 10. The first member 21 and the second member 22 of the holding member 20 sandwiches the corrugated tube 10 therebetween in a state that the holding member 20 is arranged in this orientation.

In this case, the protruding portions 24 formed on the inner surface 23 of the holding member 20 are inserted into the valley parts 13 of the corrugated tube 10 formed in a bellows shape. The distance between the protruding portions 24 formed in the holding member 20 is set to the integral multiple of the pitch of the valley parts 13 of the corrugated tube 10 and hence, the protruding portions 24 formed on the inner surface 23 of the holding member 20 are all inserted into the respective valley parts 13 of the corrugated tube 10. In this manner, the protruding portions 24 of both the first member 21 and the second member 22 are inserted into the respective valley parts 13 of the corrugated tube 10. In this state, the first member 21 and the second member 22 sandwiches the corrugated tube 10 therebetween, and the first-member-side engaging claw 31 and the second-member-side engaging claw 32 of the locking mechanism 30 are engaged with each other thus fixing the holding member 20 to the corrugated tube 10. When the holding member 20 is fixed to the corrugated tube 10, the protruding portions 24 are inserted into the respective valley parts 13 of the corrugated tube 10 formed in a bellows shape in this manner thus restricting the movement of the holding member 20 relative to the corrugated tube 10 in the extending direction of the corrugated tube 10.

When the length of the corrugated tube 10 is assumed to be the maximum value in a design tolerance, the vicinity of the end portion 11 of the corrugated tube 10 is, as necessary, brought closer to the abutment portion 27 of the tolerance absorption part 26 provided to the second member 22 relative to the position of the end portion 11 in the case where the length of the corrugated tube 10 is assumed to be a value other than the maximum value in the design tolerance. That is, when the length of the corrugated tube 10 is assumed to be the maximum value in the design tolerance, in order to absorb the tolerance, the holding member 20 is attached to the corrugated tube 10 so that the position of the holding member 20 is shifted by one pitch of the valley part 13 of the corrugated tube 10 in the direction in which the end portion 11 of the corrugated tube 10 approaches the abutment portion 27 of the tolerance absorption part 26, for example, as compared with the case where the length of the corrugated tube 10 is assumed to be the minimum value in the design tolerance. To be more specific, to consider a case where the length of the corrugated tube 10 is assumed to be the maximum value in the design tolerance, when each protruding portion 24 provided to the holding member 20 is inserted into each valley part 13 of the corrugated tube 10 formed in a bellows shape, the protruding portion 24 is inserted into the valley part 13 located at a position shifted in the direction away from the end portion 11 by one pitch of the valley part 13 rather than the valley part 13 into which the protruding portion 24 is inserted when the length of the corrugated tube 10 is assumed to be a value other than the maximum value in the design tolerance. Accordingly, when the length of the corrugated tube 10 is assumed to be the maximum value in the design tolerance, the holding member 20 is attached to the corrugated tube 10 in a state that the length of a part between the protruding portion 24 of the holding member 20 and the end portion 11 in the corrugated tube 10 is set longer than a length in the case where the length of the corrugated tube 10 is assumed to be a value other than the maximum value in the design tolerance, and the tolerance absorption part 26 confines thereto the length of one pitch of the valley part 13 of the corrugated tube 10 to absorb the design tolerance.

The holding member 20 is attached to the corrugated tube 10, after the holding member 20 is secured to the corrugated tube 10, the electric wire 5 is fixed to the holding member 20 by using the tie band 40. When the electric wire 5 is fixed by using the tie band 40, first of all, before forming an annular shape, the tie band 40 strip-shaped is inserted into the fixing-use hole 36 formed in the electric-wire fixing part 35 of the holding member 20. Here, the insertion of the tie band 40 into the fixing-use hole 36 may be performed before fixing the holding member 20 to the corrugated tube 10. The insertion of the tie band 40 into the fixing-use hole 36 may be performed at any time before or after the holding member 20 is fixed to the corrugated tube 10.

When the electric wire 5 is fixed by using the tie band 40 inserted into the fixing-use hole 36 formed in the holding member 20, the tie band 40 is deformed into an annular shape so that a part of the electric wire 5 extended outwardly from the corrugated tube 10 is brought into the inside of the annular shape. After the tie band 40 is deformed into an annular shape, the circular size of the annular shape is decreased by adjusting a locking mechanism provided to the tie band 40. With such a constitution, a tensile force is imparted to the electric wire 5 by the tie band 40 in the direction in which the electric wire 5 approaches to the electric-wire fixing part 35 provided with the fixing-use hole 36 through which the tie band 40 is inserted, and the tie band 40 approaches to the electric-wire fixing part 35. In this manner, the tensile force imparted to the electric wire 5 by decreasing the circular size of the annular shape of the tie band 40 is a tensile force when the magnitude of a force to be input to the tie band 40 in the direction in which the circular size of the annular shape of the tie band 40 is decreased by the locking mechanism provided to the tie band 40 is the magnitude of a force input by an assembly worker in general operation.

The electric wire 5 approaches the electric-wire fixing part 35 by the tensile force imparted by the tie band 40, and is fixed to the electric-wire fixing part 35 of the holding member 20. That is, the part of the electric wire 5 extended outwardly from the corrugated tube 10 and the electric-wire fixing part 35 are tightened by the tie band 40, and are bound by the tie band 40 to be fixed to the holding member 20.

Next, the effects of the wire harness WH including the above-mentioned fixing structures 100 are explained. The wire harness WH in which the electric wires 5 are fixed to the corrugated tube 10 by the fixing structure 100 is, for example, arranged in an automobile in order to electrically connect between electric components provided to the automobile. Accordingly, the electric wires 5 transmit electrical signals between the electric components, and supply electric power to the electric components. In this case, in the automobile, various vibrations due to irregularities of a road surface occur, and the vibrations are transmitted to the electric wires 5. However, the holding member 20 and the tie band 40 fix the electric wires 5 to the corrugated tube 10 through the holding member 20 and hence, even when the vibrations are transmitted to the electric wires 5, the electric wires 5 are hardly displaced in the corrugated tube 10. Accordingly, each of the electric wires 5 performs, for example, the transmission of the electrical signals without being damaged by the vibrations.

The fixing structure 100 of the electric wire 5 according to the first embodiment mentioned above includes the holding member 20 fixed to the corrugated tube 10 that is formed in a cylindrical shape and covers the electric wire 5 inserted therein, the electric wire 5 being made of at least a conductive material and extending in one direction, and the tie band 40 that fixes a part of the electric wire 5 to the holding member 20, the part being extended outwardly from the corrugated tube 10. With such a constitution, the electric wire 5 inserted into the corrugated tube 10 can be fixed to the holding member 20 by the tie band 40, the holding member 20 being fixed to the corrugated tube 10 from the outside of the corrugated tube 10. As a result, the electric wire 5 can be fixed to the corrugated tube 10 formed in a cylindrical shape.

Furthermore, the corrugated tube 10 includes a part formed in a bellows shape, the holding member 20 includes the protruding portions 24 formed on surfaces facing the corrugated tube 10 when the holding member 20 is fixed to the corrugated tube 10, and the holding member 20 is fixed to the corrugated tube 10 by the protruding portions 24 inserted into the valley parts 13 of the bellows shape thus restricting the movement of the holding member 20 relative to the corrugated tube 10 in the extending direction of the corrugated tube 10. With this constitution, the electric wire 5 fixed to the holding member 20 by the tie band 40 is restricted the movement thereof relative to the corrugated tube 10 in the extending direction of the corrugated tube 10. As a result, the electric wire 5 can be fixed more securely to the corrugated tube 10 formed in a cylindrical shape.

Furthermore, the tie band 40 binds the electric wire 5 on the holding member 20 to fix the electric wire 5 to the holding member 20 thus fixing the electric wire 5 easily to the holding member 20. As a result, the electric wire 5 can be easily fixed to the corrugated tube 10 formed in a cylindrical shape.

Furthermore, the holding member 20 includes the tolerance absorption part 26 including the abutment portion 27 and hence, when the length of the corrugated tube 10 is assumed to be the maximum value in a design tolerance, the design tolerance can be absorbed in the tolerance absorption part 26. As a result, the holding member 20 can be fixed appropriately to the corrugated tube 10 irrespective of the actual length of the corrugated tube 10.

The holding member 20 includes the hinge 25 and the locking mechanism 30 thus attaching the holding member 20 to the corrugated tube 10 without using another member. As a result, attaching the holding member 20 to the corrugated tube 10 can be performed easily, and the number of components can be reduced thus achieving the reduction of manufacturing cost.

Furthermore, the wire harness WH according to first embodiment includes the electric wire 5 that is made of at least a conductive material and extends in one direction; the corrugated tube 10 that is formed in a cylindrical shape and covers the electric wire 5 inserted therein; and the fixing structure 100 of the electric wire 5 including the holding member 20 fixed to the corrugated tube 10 from the outside of the corrugated tube 10, and the tie band 40 that fixes a part of the electric wire 5 extended outwardly from the corrugated tube 10 to the holding member 20. With this constitution, the electric wire 5 inserted into the corrugated tube 10 can be fixed to the holding member 20 from the outside of the corrugated tube 10 by the tie band 40. As a result, the electric wire 5 can be fixed to the corrugated tube 10 formed in a cylindrical shape.

Second Embodiment

A fixing structure 100 of an electric wire 5 according to a second embodiment has the approximately same constitution as that of the fixing structure 100 of the electric wire 5 according to the first embodiment, and characterized in that a holding member 50 is fixed by a holding-member fixing tape 60. Since the other constitution of the second embodiment is the same as that of the first embodiment, parts having the identical functions are given the same numerals and their repeated explanations are omitted.

Figure 6:
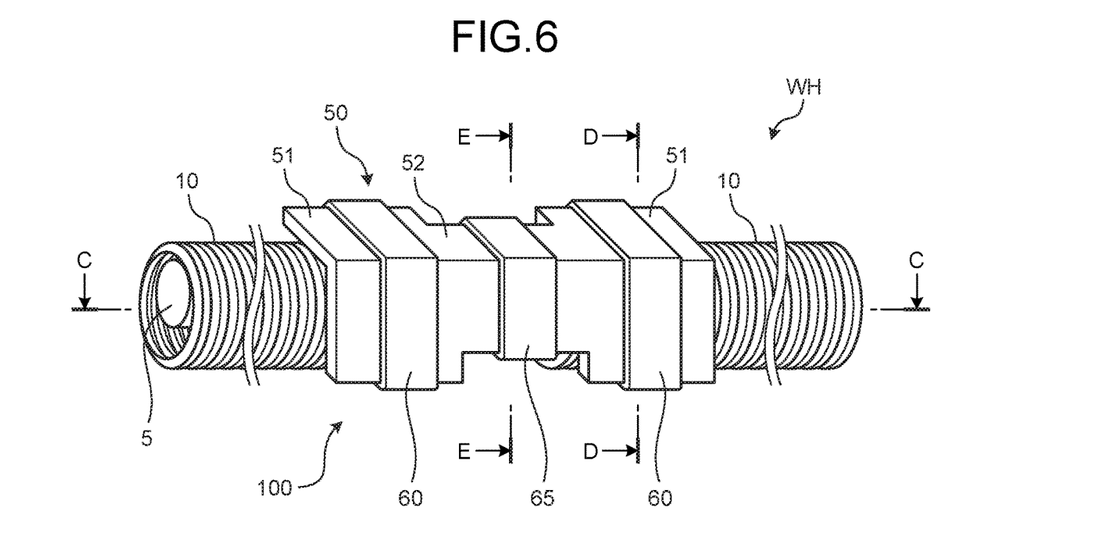
FIG. 6 is a perspective view of a wire harness provided with a fixing structure according to a second embodiment.
Figure 7:
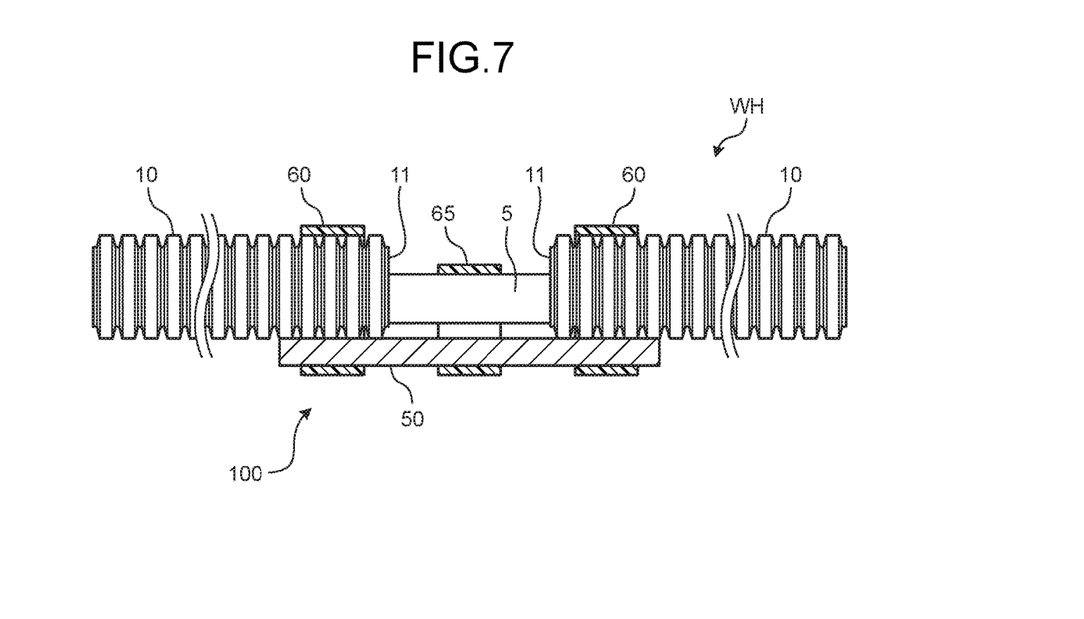
FIG. 7 is a cross-sectional view taken along a line C-C in FIG. 6.

FIG. 6 is a perspective view of a wire harness having a fixing structure according to the second embodiment. FIG. 7 is a cross-sectional view taken along a line C-C in FIG. 6. In a wire harness WH illustrated in FIG. 6 and FIG. 7, the electric wire 5 is inserted into each of two corrugated tubes 10 spaced apart from each other in the axial direction of the corrugated tubes 10, and thus the electric wire 5 is extended outwardly from the corrugated tubes 10 in a space between the corrugated tubes 10. The holding member 50 that constitutes the fixing structure 100 according to the second embodiment is formed in a substantially L-shape as viewed in the axial directional of the corrugated tube 10, extended in the axial direction of the corrugated tube 10, and fixed to the outside of the corrugated tube 10.

The holding member 50 includes holding-member fixing parts 51 each of which fixes the holding member 50 to the corrugated tube 10, and electric-wire fixing parts 52 each of which fixes the electric wire 5 to the holding member 50. The holding-member fixing parts 51 are formed on two places on the holding member 50 so that the holding-member fixing parts 51 are positioned on both sides of the electric-wire fixing parts 52 in the axial direction of the corrugated tube 10 when the holding member 50 is fixed to the corrugated tube 10. Each of the holding-member fixing parts 51 and the electric-wire fixing part 52 is formed in a substantially L-shape as viewed in the axial directional of the corrugated tube 10, and the electric-wire fixing part 52 is formed in such a manner that a length of a side of the L-shape as viewed in the axial direction is shorter than that of the holding-member fixing part 51.

The holding member 50 is attached to the corrugated tubes 10 in a state that the two holding-member fixing parts 51 each face the respective corrugated tubes 10 different from each other, and the electric-wire fixing part 52 faces the electric wire 5 that is between the corrugated tubes 10 and extended outwardly from the corrugated tubes 10. In this manner, the holding member 50 in which the two holding-member fixing parts 51 each are attached to the respective corrugated tubes 10 different from each other is fixed to the corrugated tubes 10 by the holding-member fixing tapes 60 including what is called an adhesive tape that is formed in a strip shape and applies adhesive to one surface thereof. Each of the holding-member fixing tapes 60 serves as a holding-member fixing member for fixing the holding member 50 to the corrugated tube 10 by integrally wrapping the holding member 50 and the corrugated tube 10.

Figure 8:
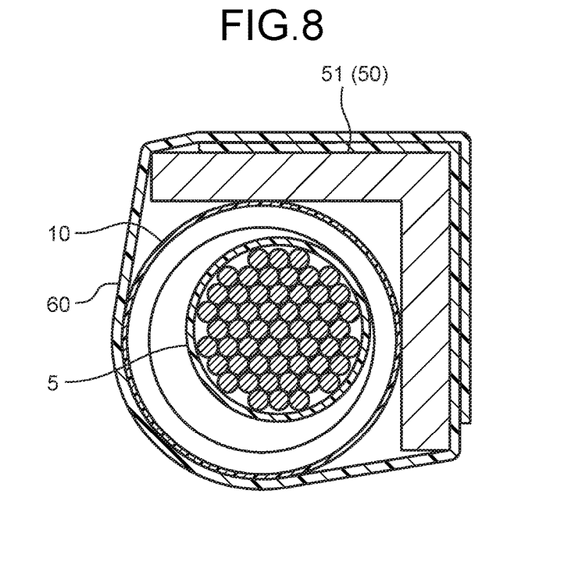
FIG. 8 is a cross-sectional view taken along a line D-D in FIG. 6.

FIG. 8 is a cross-sectional view taken along a line D-D in FIG. 6. The explanation is made with respect to procedures of fixing the holding-member fixing part 51 of the holding member 50 to the corrugated tube 10. When the holding-member fixing part 51 of the holding member 50 is fixed to the corrugated tube 10, two surfaces on the minor angle side of the L-shape of the holding-member fixing part 51 are arranged to face the outside surface of the corrugated tube 10 in an opposed manner, and brought into contact with the outside surface of the corrugated tube 10. In this state, the holding-member fixing tape 60 integrally wraps two surfaces on the major angle side of the L-shape of the holding-member fixing part 51 and the outside surface of the corrugated tube 10 while the adhesion surface of the holding-member fixing tape 60 faces the outside surface of the corrugated tube 10. Accordingly, the holding-member fixing part 51 is fixed to the corrugated tube 10. The procedures of fixing the holding-member fixing part 51 to the corrugated tube 10 using the holding-member fixing tape 60 is separately performed with respect to each of the two holding-member fixing parts 51 to be fixed to the respective corrugated tubes 10 different from each other in the same manner as above.

Figure 9:
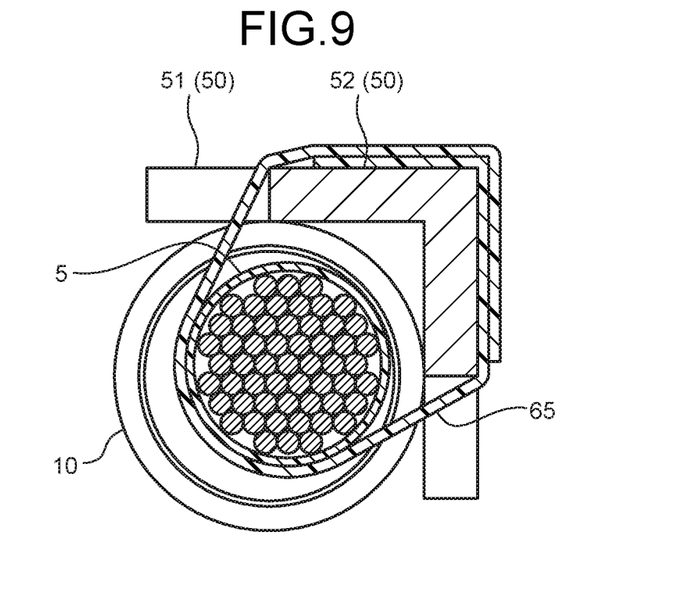
FIG. 9 is a cross-sectional view taken along a line E-E in FIG. 6.

FIG. 9 is a cross-sectional view taken along a line E-E in FIG. 6. The electric wire 5 is fixed to the electric-wire fixing part 52 of the holding member 50 at a part of the electric wire 5 that is located between the two corrugated tubes 10 and extended outwardly from the corrugated tubes 10, by an electric-wire fixing tape 65 that is a wiring-material fixing member. To be more specific, when the holding member 50 is fixed to the corrugated tube 10, the electric wire 5 is assumed to be in a state in which the electric wire 5 faces the two surfaces on the minor angle side of the L-shape of the electric-wire fixing part 52. In this state, the electric-wire fixing tape 65 integrally wraps the two surfaces on the major angle side of the L-shape of the electric-wire fixing part 52 and the peripheral face of the electric wire 5 while the adhesion surface of the holding-member fixing tape 60 faces the peripheral face of the electric wire 5. Accordingly, the electric wire 5 is fixed to the electric-wire fixing part 52. The electric-wire fixing tape 65 is what is called an adhesive tape in the same manner as the case of the holding-member fixing tape 60, for fixing the electric wire 5 to the holding member 50 by integrally wrapping the electric wire 5 and the electric-wire fixing part 52 of the holding member 50 in this manner.

The electric wire 5 inserted into the corrugated tube 10 is fixed by the electric-wire fixing tape 65 with respect to the holding member 50 fixed to the corrugated tube 10 by the holding-member fixing tape 60 and hence, even when vibrations are transmitted to the electric wire 5, the electric wire 5 is hardly displaced in the corrugated tube 10. Accordingly, the electric wire 5 performs the transmission of the electrical signals or the like, without being damaged by the vibrations.

In the fixing structure 100 according to the second embodiment above, the holding member 50 is fixed to the corrugated tube 10 by the holding-member fixing tape 60 integrally wrapping the holding member 50 and the corrugated tube 10 and hence, the holding member 50 that is a member used when the electric wire 5 is fixed to the corrugated tube 10 can be easily fixed to the corrugated tube 10. As a result, the electric wire 5 can be easily fixed to the corrugated tube 10.

Furthermore, the electric-wire fixing tape 65 integrally wraps the electric wire 5 and the holding member 50 to fix the electric wire 5 to the holding member 50 thus fixing the electric wire 5 easily to the holding member 50. As a result, the electric wire 5 can be easily fixed to the corrugated tube 10 formed in a cylindrical shape.

Modifications

Figure 10:
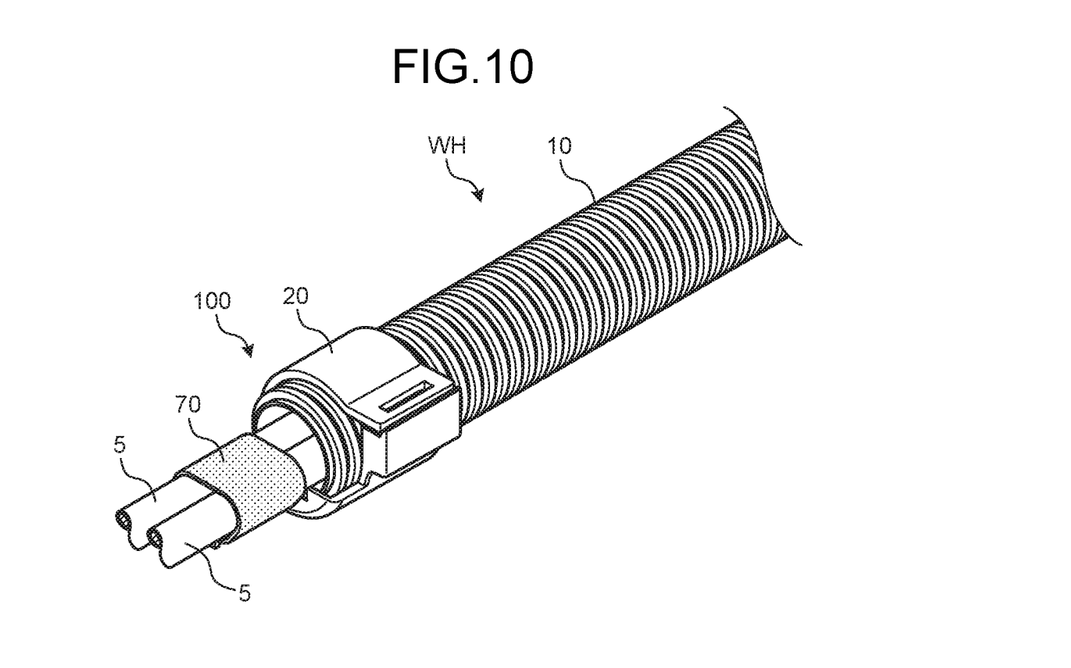
FIG. 10 is a perspective view illustrating a modification of the fixing structure according to the first embodiment in a state that electric wires are fixed to a holding member by an electric-wire fixing tape.

In the fixing structure 100 according to the first embodiment above, the electric wire 5 is fixed to the holding member 20 by the tie band 40. However, the electric wire 5 may be fixed to the holding member 20 by using a member other than the tie band 40. FIG. 10 is a perspective view illustrating a modification of the fixing structure according to the first embodiment in a state that electric wires are fixed to a holding member by an electric-wire fixing tape. In the fixing structure 100 according to the first embodiment, when the electric wire 5 is fixed to the holding member 20 by using a member other than the tie band 40, an electric-wire fixing tape 70 including an adhesive tape may be, for example, used as a wiring-material fixing member that fixes the electric wire 5 to the holding member 20 in the same manner as the fixing structure 100 according to the second embodiment.

Figure 11:
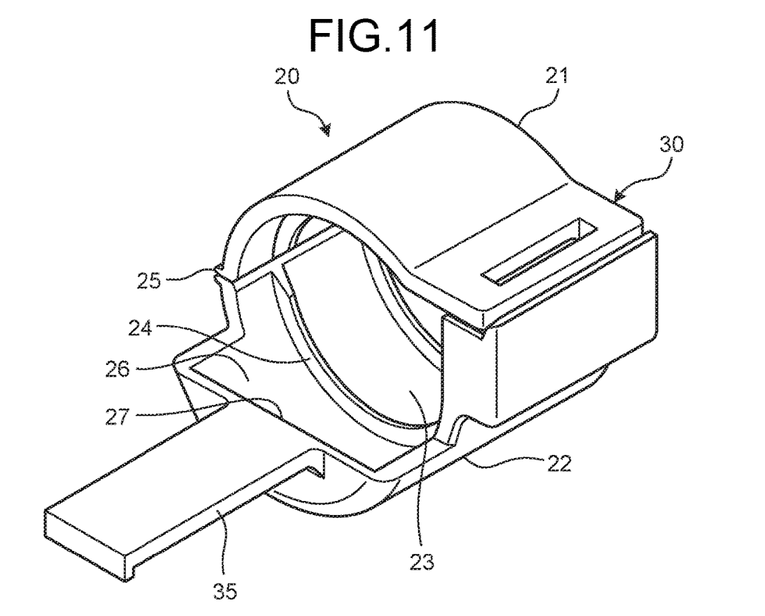
FIG. 11 is a perspective view of the holding member illustrated in FIG. 10.
Figure 12:
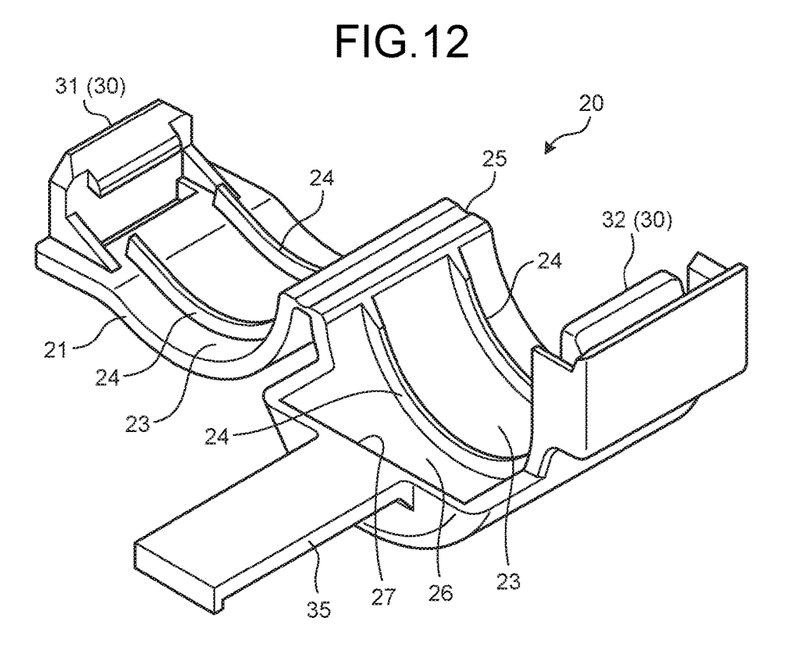
FIG. 12 is a perspective view illustrating a first member and a second member of the holding member illustrated in FIG. 11 in an open state.

FIG. 11 is a perspective view of the holding member illustrated in FIG. 10. FIG. 12 is a perspective view illustrating a first member and a second member of the holding member illustrated in FIG. 11 in an open state. To consider a case where the electric wire 5 is fixed to the corrugated tube 10 by using the holding member 20 including the first member 21 and the second member 22 connected with each other by a hinge 25 in an openable/closeable manner, when the electric-wire fixing tape 70 is used as the wiring-material fixing member, the second member 22 is formed without providing the electric-wire fixing part 35 with the fixing-use hole 36.

When the electric wire 5 is fixed to the holding member 20 formed in this manner, the holding member 20 is first fixed to the corrugated tube 10 so that the electric-wire fixing part 35 faces a part of the electric wire 5 that is extended outwardly from the corrugated tube 10. In this state, the electric-wire fixing tape 70 wraps a surface opposite to a side on which the electric wire 5 is located in the electric-wire fixing part 35 and the peripheral face of the electric wire 5 while the adhesion surface of the electric-wire fixing tape 70 faces the peripheral face of the electric wire 5. Accordingly, the electric wire 5 is fixed to the electric-wire fixing part 35. In the fixing structure 100 according to the first embodiment, the electric wire 5 may be fixed to the holding member 20 by using a member other than the tie band 40 in this manner.

In the fixing structure 100 according to the second embodiment, a member other than the holding-member fixing tape 60 may be used as a holding-member fixing member, and a member other than the electric-wire fixing tape 65 may be used as a wiring-material fixing member. For example, as the holding-member fixing member or the wiring-material fixing member in the fixing structure 100 according to the second embodiment, a band provided with a locking mechanism, such as the tie band 40 in the fixing structure 100 according to the first embodiment, may be used. Any holding-member fixing member capable of appropriately fixing the holding member 50 to the corrugated tube 10 may be applicable, and any wiring-material fixing member capable of appropriately fixing the electric wire 5 to the holding member 20 or 50 may be applicable.

Figure 13:
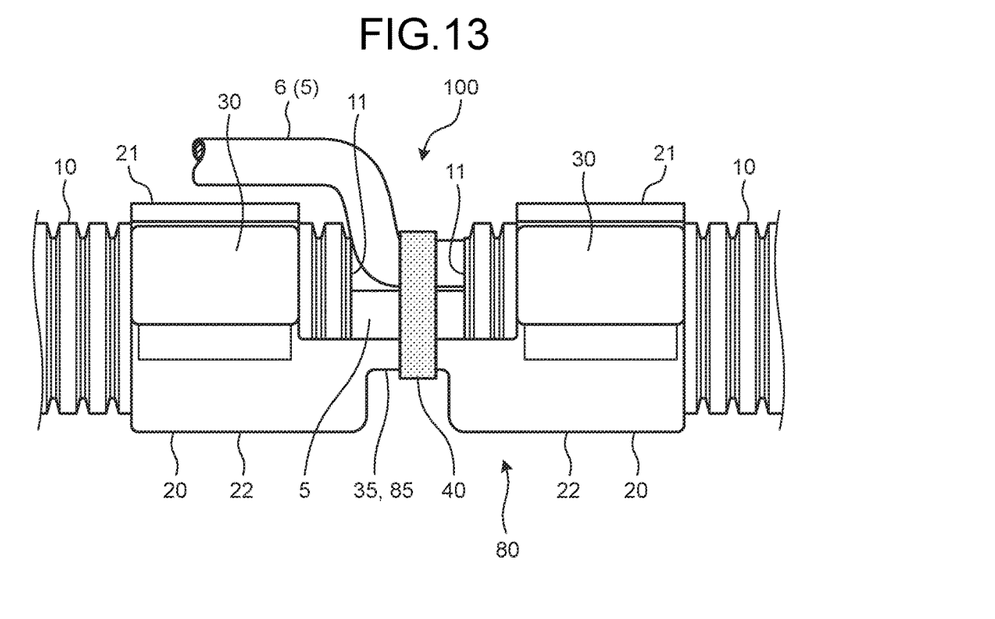
FIG. 13 is an explanatory view illustrating a modification of the fixing structure according to the first embodiment in a state that electric wires at a branched portion are fixed to a corrugated tube.

In the fixing structure 100 according to the first embodiment above, the electric wire 5 inserted into the corrugated tube 10 is fixed to the corrugated tube 10 at a part of the electric wire 5 that is extended outwardly from the corrugated tube 10. However, the electric wire 5 may be fixed to the corrugated tube 10 at a part other than the above-mentioned part. FIG. 13 is an explanatory view illustrating a modification of the fixing structure according to the first embodiment in a state that electric wires at a branched portion are fixed to a corrugated tube. As illustrated in FIG. 13, some of a plurality of electric wires 5 inserted into the corrugated tubes 10 may be, for example, fixed to the corrugated tubes 10 at a portion where the electric wires 5 are branched and extended outwardly from the corrugated tube 10. In this case, two corrugated tubes 10 spaced apart from each other in the axial direction of the corrugated tubes 10 are used, and some of the electric wires 5 are inserted into both of the two corrugated tubes 10.

By contrast, a branched electric wire 6 that is the electric wire 5 branched is inserted into only one of the two corrugated tubes 10, and extended outwardly from the corrugated tubes 10 without being inserted into the other corrugated tube 10. That is, a part of the branched electric wire 6 that is not inserted into the corrugated tube 10 is extended outwardly from the corrugated tubes 10 through a space between the corrugated tubes 10 for wiring.

In this manner, as the holding member 20 that fixes the branch portion of the electric wire 5 to the corrugated tube 10, a joint holding member 80 formed by joining the two holding members 20 each of which is used in the fixing structure 100 according to the first embodiment is used. The joint holding member 80 is constituted so that the two holding members 20 are joined each other in such a manner that the two holding members 20 are aligned on the same axis, the respective sides of the holding members 20 on which the electric-wire fixing part 35 is located face each other in an opposed manner, and the holding members 20 share the electric-wire fixing part 35 with each other. That is, in the joint holding member 80, the electric-wire fixing part 35 provided to the second member 22 in each of the two holding members 20 is shared, and the electric-wire fixing part 35 is used as a joint portion 85 thus forming the joint holding member 80 by joining the two holding members 20.

The joint holding member 80 formed by joining the two holding members 20 attaches the two holding members 20 joined each other to the respective corrugated tubes 10 different from each other. That is, the first member 21 and the second member 22 provided to each of the two holding members 20 that form the joint holding member 80 sandwich independently a portion in the vicinity of an end portion 11 of each of the two corrugated tubes 10. Accordingly, the two holding members 20 which form the joint holding member 80 are fixed to the respective corrugated tubes 10 different from each other.

In this manner, the electric wire 5 that passes through both of the corrugated tubes 10 and the branched electric wire 6 that extends outwardly from the space between the corrugated tubes 10 are located between the corrugated tubes 10 to which the joint holding member 80 is fixed. Both of the electric wire 5 and the branched electric wire 6 are fixed to the electric-wire fixing part 35, which is the joint portion 85, of the joint holding member 80 by the tie band 40. That is, the electric wire 5 and the branched electric wire 6 are collectively bound on the electric-wire fixing part 35 with the tie band 40 thus being fixed to the electric-wire fixing part 35. In this manner, the joint holding member 80 is fixed to a portion in the vicinity of the space between the two corrugated tubes 10 from which the branched electric wires 6 extended outwardly, and the electric wire 5 and the branched electric wire 6 are fixed to the joint holding member 80 thus fixing easily a portion of the electric wires 5 in the vicinity of the branched electric wire 6 to the corrugated tube 10.

In the fixing structure 100 according to the first and second embodiments, the explanation is made by taking the electric wire 5 as an example of a wiring material. However, any wiring material other than the electric wire 5 may be applicable. The wiring material may be a metallic rod formed, for example, in such a manner that a conductive material such as a metallic material is extended in a wire-like shape. Even when such a metallic rod is inserted into the corrugated tube 10, the holding member 20 in the first embodiment or the holding member 50 in the second embodiment is fixed to the corrugated tube 10, and the metallic rod is fixed to the holding member 20 or 50 thus fixing easily the metallic rod to the corrugated tube 10. As for a wiring member inserted into the corrugated tube 10, any type of material capable of being used for the transmission of electricity is applicable.

Furthermore, the fixing structure 100 according to the first and second embodiments above is explained by taking the corrugated tube 10 as an example of a sheath. However, any sheath other than the corrugated tube 10 may be applicable. Any type of sheath formed in a cylindrical shape, and capable of inserting a wiring material such as the electric wire 5 thereinto to protect the wiring material is applicable.

The fixing structure for the wiring material and the wire harness according to the present invention achieve the advantageous effect that the wiring material is capable of being fixed to the sheath formed in a cylindrical shape.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A fixing structure for a wiring material, comprising:
   a holding member fixed on an outer surface of a sheath that is formed in a hollow cylindrical shape and covers a wiring material inserted therein, the wiring material being made of at least a conductive material and extending in one direction;
   a wiring-material fixing part that is connected to the holding member, extends away from the holding member, and receives a part of the wiring material that extends outwardly from the sheath;
   a wiring-material fixing member that fixes the part of the wiring material that extends outwardly from the sheath to the holding member; and
   a holding-member fixing member that integrally wraps the holding member and the sheath so as to fix the holding member to the sheath, wherein
   the wiring-material fixing member engages an outer surface of each of the wiring-material fixing part and the part of the wiring material that extends outwardly from the sheath, and integrally wraps around the wiring-material fixing part and the part of the wiring material that extends outwardly from the sheath so as to bind the part of the wiring material on the holding member to fix the part of the wiring material against the wiring-material fixing part.

2. The fixing structure for the wiring material according to claim 1, wherein
   the sheath includes a part formed in a bellows shape,
   the holding member includes a protruding portion on a surface thereof facing the sheath when the holding member is fixed to the sheath, and
   the protruding portion is inserted into a valley part of the bellows shape and fixed to the sheath so as to restrict movement of the holding member relative to the sheath in an extending direction of the sheath.

3. A wire harness comprising:
   a wiring material that is made of at least a conductive material and extends in one direction;
   a sheath that is formed in a cylindrical shape and covers the wiring material inserted therein; and
   a fixing structure for the wiring material, the fixing structure including a holding member fixed to the sheath on the outside of the sheath, a wiring-material fixing part that is connected to the holding member, extends away from the holding member, and receives a part of the wiring material that extends outwardly from the sheath, a wiring-material fixing member that fixes the part of the wiring material that extends outwardly from the sheath to the holding member, and a holding-member fixing member that integrally wraps the holding member and the sheath so as to fix the holding member to the sheath, wherein the wiring-material fixing member engages an outer surface of each of the wiring-material fixing part and the part of the wiring material that extends outwardly from the sheath, and integrally wraps around the wiring-material fixing part and the part of the wiring material that extends outwardly from the sheath so as to bind the part of the wiring material on the holding member to fix the part of the wiring material against the wiring-material fixing part.

4. The wire harness according to claim 3, further comprising a second sheath that is spaced apart from the sheath and covers the wiring material inserted therein, and wherein
the part of the wiring material that extends outwardly from the sheath also extends between the sheath and the second sheath, and is exposed outside of the second sheath,
the holding member includes a first holding member that engages the sheath and a second holding member that engages the second sheath,
the wiring material fixing part extends from the first holding member to the second holding member, and
the wire-material fixing member integrally wraps the wiring-material fixing part and the part of the wiring material that extends between the sheath and the second sheath so as to fix the wiring material to the holding member.

5. The fixing structure for the wiring material according to claim 1, wherein
the wiring-material fixing part includes a hole, and
the wiring-material fixing member includes a tie band that passes through the hole.

6. The fixing structure for the wiring material according to claim 1, wherein the wiring-material fixing member includes a fixing tape.

7. The fixing structure for the wiring material according to claim 1, wherein
the wiring-material fixing member allows adjustments to decrease a circular size of an annular shape of the wiring-material fixing member.

8. The fixing structure for the wiring material according to claim 3, wherein
the wiring-material fixing member allows adjustments to decrease a circular size of an annular shape of the wiring-material fixing member.

9. The fixing structure for the wiring material according to claim 1, wherein the wiring-material fixing member imparts, to the holding member and the part of the wiring material that extends outwardly from the sheath, a tensile force in a direction in which the part of the wiring material is brought closer to and into contact with the holding member.

10. The wire harness according to claim 3, wherein the wiring-material fixing member imparts, to the holding member and the part of the wiring material that extends outwardly from the sheath, a tensile force in a direction in which the part of the wiring material is brought closer to and into contact with the holding member.

11. A wire harness comprising:
a wiring material that is made of at least a conductive material and extends in one direction;
a sheath that is formed in a cylindrical shape and covers the wiring material inserted therein;
a fixing structure for the wiring material, the fixing structure including a holding member fixed to the sheath on the outside of the sheath, a wiring-material fixing part that is connected to the holding member, extends away from the holding member, and receives a part of the wiring material that extends outwardly from the sheath, and a wiring-material fixing member that fixes the part of the wiring material that extends outwardly from the sheath to the holding member; and
a second sheath that is spaced apart from the sheath and covers the wiring material inserted therein, wherein
the wiring-material fixing member engages an outer surface of each of the wiring-material fixing part and the part of the wiring material that extends outwardly from the sheath, and integrally wraps or integrally binds the wiring-material fixing part and the part of the wiring material that extends outwardly from the sheath so as to fix the part of the wiring material between the wiring-material fixing part and the wiring-material fixing member,
the part of the wiring material that extends outwardly from the sheath also extends between the sheath and the second sheath, and is exposed outside of the second sheath,
the holding member includes a first holding member that engages the sheath and a second holding member that engages the second sheath,
the wiring material fixing part extends from the first holding member to the second holding member, and
the wire-material fixing member integrally wraps the wiring-material fixing part and the part of the wiring material that extends between the sheath and the second sheath so as to fix the wiring material to the holding member.

\* \* \* \* \*